United States Patent [19]

Hohberg

[11] Patent Number: 5,285,320
[45] Date of Patent: Feb. 8, 1994

[54] MIRROR FOR CHANGING THE GEOMETRICAL FORM OF A LIGHT BEAM

[75] Inventor: Gerhard Hohberg, Aalen, Fed. Rep. of Germany

[73] Assignee: Carl-Zeiss-Stiftung, Heidenheim

[21] Appl. No.: 788,997

[22] Filed: Nov. 7, 1991

Related U.S. Application Data

[63] Continuation-in-part of Ser. No. 505,177, Apr. 5, 1990, abandoned.

[30] Foreign Application Priority Data

Apr. 14, 1989 [DE] Fed. Rep. of Germany ....... 3912237

[51] Int. Cl.$^5$ .................. G02B 5/08; B23K 26/00
[52] U.S. Cl. ................... 359/853; 359/868; 359/869; 359/900; 219/121.74; 219/121.85
[58] Field of Search ........... 359/850, 851, 852, 853, 359/867, 868, 869, 900; 219/121.74, 121.76, 121.85

[56] References Cited

U.S. PATENT DOCUMENTS

| | | |
|---|---|---|
| 3,613,659 | 10/1971 | Phillips . |
| 4,484,334 | 11/1984 | Pressley ........................ 350/612 |
| 4,518,232 | 5/1985 | Dagenais ...................... 350/620 |
| 4,692,583 | 9/1987 | Kimura et al. ................ 350/613 |
| 5,138,490 | 8/1992 | Hohberg et al. .............. 359/570 |
| 5,148,326 | 9/1992 | Hohberg ....................... 359/853 |

FOREIGN PATENT DOCUMENTS

| | | |
|---|---|---|
| 2525733 | 10/1983 | France . |
| 0330730 | 8/1936 | Italy .............................. 350/613 |
| 59-151101 | 8/1984 | Japan .......................... 350/630 |
| 63-77178 | 4/1988 | Japan . |
| 0160209 | 5/1933 | Switzerland ................. 350/613 |
| 2062282 | 5/1981 | United Kingdom . |

OTHER PUBLICATIONS

"Induced Spatial Incoherence Optical Delay Element" by Barret H. Ripin, Navy Technical Disclosure Bulletin, vol. 10, No. 4, Jun. 1985, pp. 25 to 32.

"High concentration solar collector of the stepped spherical type: optical design characteristics" by B. Authier and L. Hill, Applied Optics, vol. 19, No. 20, Oct. 15, 1980, pp. 3554 to 3561.

"Multifaceted laser beam integrators: general formulation and design concepts" by Fred M. Dickey and Burton D. O'Neill, Optical Engineering, vol. 27, No. 11, Nov. 1988, pp. 999 to 1005.

"A Convex Beam Integrator" by S. L. Ream, Laser Focus, Nov. 1979, pp. 68-71.

*Primary Examiner*—Bruce Y. Arnold
*Assistant Examiner*—R. D. Shafer
*Attorney, Agent, or Firm*—Walter Ottesen

[57] ABSTRACT

The invention relates to a mirror for changing the geometrical form of a light beam. The mirror includes several mirroring regions with these regions being strip-like segments. An incoming light beam impinges on several of these segments which are all so aligned that the reflected component beams from all segments are imaged on one and the same component area of an axis. The mirror can be configured as one piece which imparts a linear beam geometry with only one reflection.

9 Claims, 5 Drawing Sheets

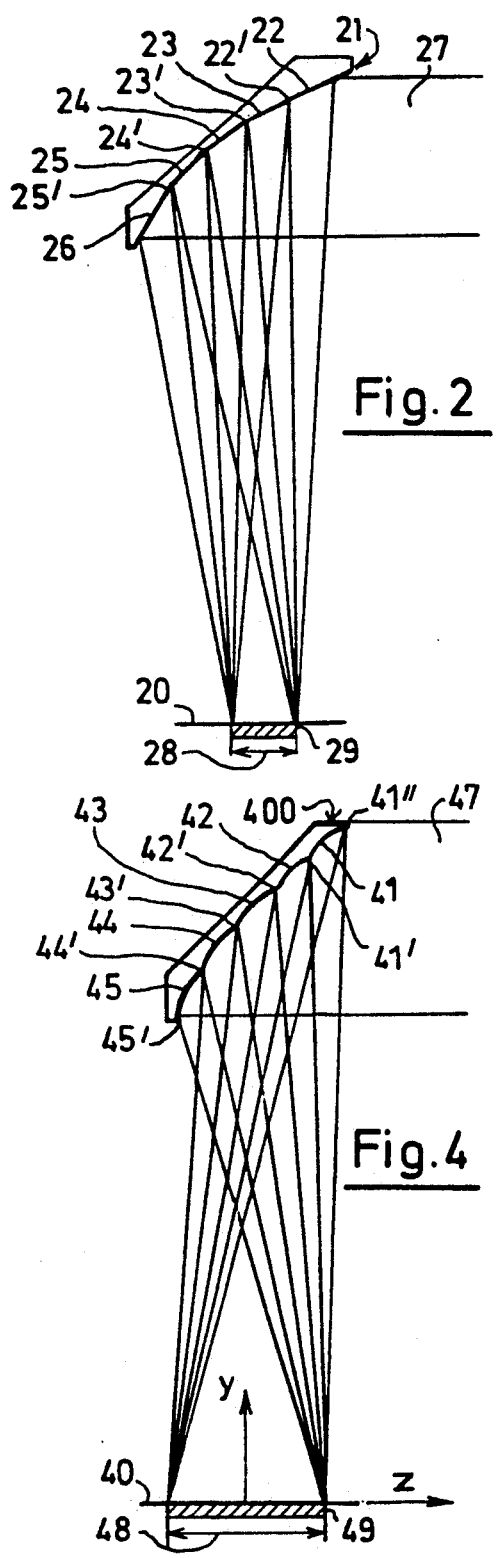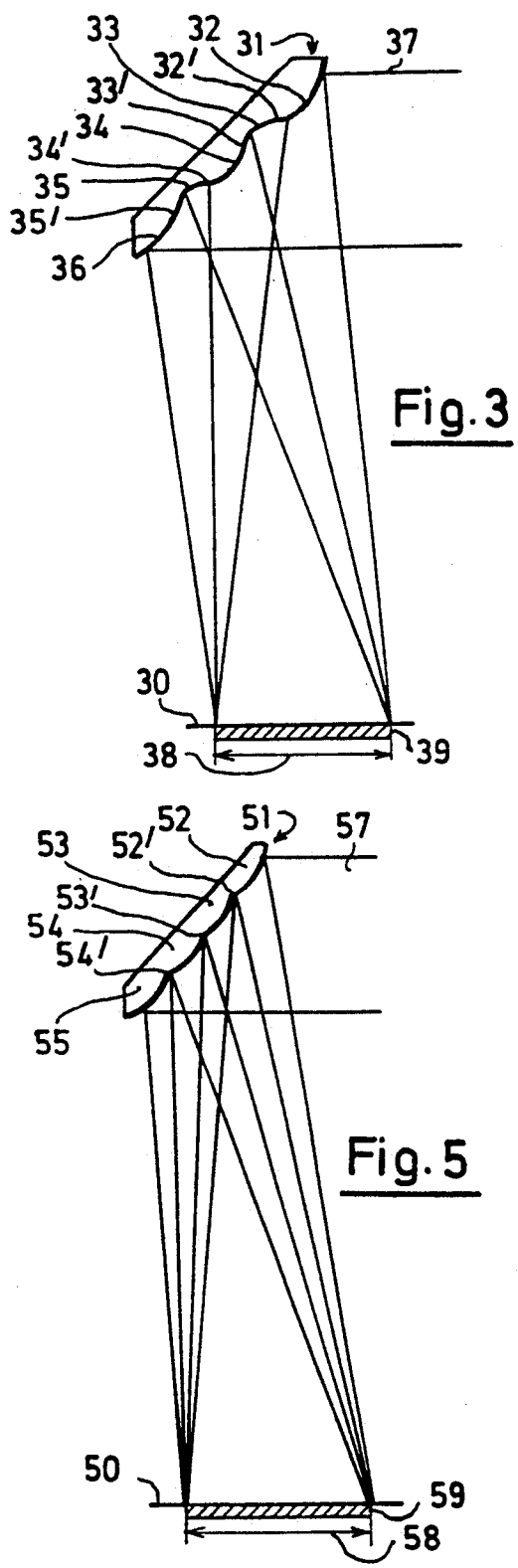

MIRROR FOR CHANGING THE GEOMETRICAL FORM OF A LIGHT BEAM

RELATED APPLICATION

This is a continuation-in-part of application Ser. No. 505,177, filed on Apr. 5, 1990, now abandoned, and entitled "Mirror for Changing the Geometrical Form of a Light Beam".

1. Field of the Invention

The invention relates to a mirror for changing the geometrical form of a light beam having several zones. The invention also relates to a method of using the mirror to process the surface of a workpiece.

2. Background of the Invention

Mirrors for changing the geometrical form of a light beam are widely known. It is difficult to generate a beam cross section which has a configuration which can be essentially linear to rectangular and within which the intensity of the beam has a constant value. Such beam cross sections are necessary especially for conducting surface treatment with a laser to name only one essential area of application.

When treating surfaces of workpieces with lasers, it is important for most applications that each point of the workpiece surface is charged with the same total energy. For this reason, the workpiece is, for example, scanned in a strip-like manner with a laser beam focused approximately to a point since most lasers used in practice supply a beam having a cross section which is not rectangular or linear and whose intensity distribution is not uniform.

When scanning with point-shaped laser beam cross sections, optical arrangements are obviated which could suitably transform any beam cross section. The advantage of arrangements having beam cross section changes is especially the increase of the processing speed.

The transforming optics assure that the laser beam has a cross section which is rectangular to linear when impinging on the work surface and that the intensity within this cross section has almost a constant value. If a beam with this kind of cross section is guided at constant speed and parallel to a pair of edges of a rectangle over the workpiece, then the energy profile within the irradiated strip is uniform.

The lasers used most in practice supply a beam having a cross section which is not rectangular and whose intensity distribution is not uniform. For this reason, optical arrangements are needed which can suitably transform any beam cross section.

Facet mirrors and integrators are two types of transforming optics which are preferably utilized for generating linear geometries with respect to the intensity distribution of laser rays.

Facet mirrors comprise a plurality of rectangular flat mirrors and each of the mirrors masks and reflects a rectangular component of desired magnitude from the beam. The flat mirrors are inclined with respect to each other so that the individual linear component beams overlap at a specific spacing.

Multi-facetted mirrors with two-dimensional arrangements of plane or spherical mirrors on ellipsoid or paraboloid concave and convex envelopes are known from U.S. Pat. No. 4,518,232, Japanese patent publications 59-151,101 and 63-77,178 as well as from an article of S. L. Ream entitled "A convex beam integrator", Laser-Focus, Volume 15, No. 11, November 1979, pages 68 to 71.

The apparatus disclosed in U.S. Pat. No. 4,518,232 and Japanese patent publication 63-77,178 produce a square shape of laser focus, while the apparatus in Japanese patent publication 59-151,101 and the above-mentioned article produce point foci. The article of S. L. Ream also discusses the difficulties of producing such convex facetted mirrors as well as the performance thereof.

Elongated rectangular plane facet mirrors arranged on a concave cylindrical envelope are disclosed in U.S. Pat. Nos. 4,484,384 and 4,475,927 and permit a parallel laser beam to be concentrated onto a rectangular area of essentially the shape of one rectangular facet mirror. Reduction of a beam of 100 mm in diameter onto a line of 100 $\mu$m width would thus require 1,000 facet mirrors, each 100 $\mu$m wide. In this case, however, the mirror optical effect would be completely distorted by diffraction effects caused by the 1,000 border lines between the facet mirrors.

Integrators comprise waveguides having at least four flat mirrors which are assembled to define a waveguide having a rectangular cross section. The manufacture of integrators presents no problems. However, they have the disadvantage that the radiation is, in part, reflected many times thereby causing high losses. Furthermore, the plane of the most advantageous intensity distribution lies at the end of a waveguide and is therefore not freely accessible. This can be obviated only by means of a further imaging which leads to further intensity losses.

SUMMARY OF THE INVENTION

It is an object of the invention to impart a linear cross section to a light beam having any beam cross section such that the intensity is homogeneous within the linear cross section.

The mirror of the invention is for changing the geometric form of a light beam and reflecting the beam onto a workpiece. The mirror includes: a mirror having a plurality of mirrored segments defined by rotational bodies and being disposed one next to the other; the segments defining respective continuous uninterrupted reflective surfaces and having respective rotational axes superposed one upon the other on a line-like region of the workpiece; the segments having respective sizes selected so as to cause the light beam to impinge simultaneously upon several of the segments so as to reflect respective zones of the beam; and, the segments each being formed and aligned so as to cause each one of the zones to be reflected only once and directed to the line-like region of the workpiece with the zones being superposed on each other on the line-like region to provide a homogeneity of the intensity distribution of the beam in the region.

The mirror of the invention is related to the arrangement for changing the geometrical form of a light beam disclosed in U.S. Pat. No. 5,138,490, filed Apr. 5, 1990, incorporated herein by reference, and to the mirror for changing the geometrical form of a light beam disclosed in U.S. Pat. No. 5,148,326, filed Jul. 29, 1991, also incorporated herein by reference.

The advantage of the mirror is that the light beam is separated into several linear zones which are directed onto a line so as to be superimposed on each other and wherein only a single reflection of each beam segment takes place. This optical transformation of the beam energy can provide excellent homogeneity of the intensity distribution which can be influenced by the number of mirror segments with minimum energy losses during optical imaging.

It is a further advantage that for mirrors of this kind, the number and therefore the length of the segments on the one hand and the length of the focus line on the other hand can be selected independently of each other.

In order to obtain a fixed relation between the individual mirror segments, the segments can be assembled into a compact component and it is advantageous to join all segments to each other so that they are mutually contiguous. In the ideal case, the mirror is manufactured from a single part having a plurality of strip-like segments.

Segments which are rotationally symmetrical to an axis are used to generate a linear image and those light beams which emanate from an axial point are so reflected by the segments that they intersect the axis again. In this way, all beams reflected by the segments are imaged on one and the same area of the rotational axis.

When designing the mirror segments, certain technical limitations must be considered when no intensity losses are to be accepted at the contact lines between the individual segments. Especially when constructing the mirror from one piece, consideration must be given to the condition that the production of pointed recesses presents considerable problems. It is therefore advantageous when no angle is present at the contact lines between the individual segments which is less than 180°. This is especially then the case when the segments all have a concave or a concave-convex contour when viewed in cross section.

Mirrors according to the invention are especially advantageous when processing surfaces of workpieces with a strip-like radiation by means of a laser. With the aid of these mirrors a line-like intensity distribution of the laser radiation is obtained having an adequate energy density to perform a desired task.

BRIEF DESCRIPTION OF THE DRAWINGS

The invention will now be described with reference to the drawings wherein:

FIG. 2 is a section view taken through a mirror according to the invention having conical segments and showing a beam having parallel light rays incident upon these segments;

FIG. 3 is a section view taken through a mirror according to another embodiment of the invention wherein the mirror has concave segments and convex segments with the incident beam of light having parallel rays;

FIG. 4 is a section view taken through a mirror according to another embodiment of the invention having concave segments with the incident beam having parallel rays;

FIG. 5 shows still another embodiment of the mirror of the invention having convex segments with the incident beam having parallel rays;

DESCRIPTION OF THE PREFERRED EMBODIMENTS OF THE INVENTION

Figure 1:
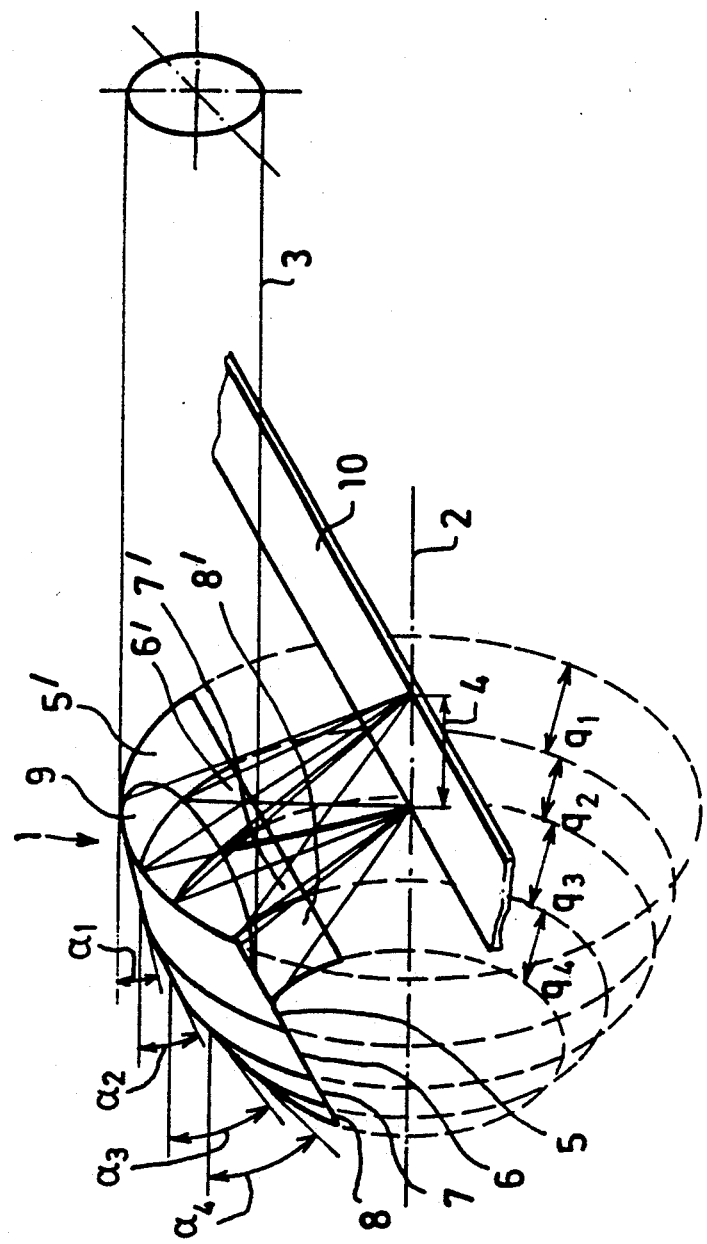
FIG. 1 is a perspective view of a mirror according to an embodiment of the invention with the mirror having rotationally symmetrical surfaces.

The mirror 1 shown in FIG. 1 defines a symmetry axis 2. A laser beam 3 runs parallel to the symmetry axis 2 and the mirror 1 images this beam into a linear work area 4 on the symmetry axis 2. This configuration proceeds from the premise that, when treating the surfaces of workpieces with lasers, the width of the distribution can especially be small so that an approximately linear but uniform distribution of the intensity is obtained in the work area 4.

The mirror 1 is represented by solid lines and comprises four segments (5, 6, 7, 8). Each segment (5, 6, 7, 8) is a part of a cone having a mirrored inner wall surface. The size of the mirror 1 must be matched to the magnitude of the diameter of the laser beam 3 so that the beam 3 impinges on all segments (5, 6, 7, 8) of the mirror 1. The set angles $\alpha_i$ of the conical segments (5, 6, 7, 8) as well as their extension in the direction of the symmetry axis 2 are determined by the size of the work area 4.

A second segment 6 is contiguous to the first segment 5 of the mirror 1 having the set angle $\alpha_1$. The segment 6 has a different set angle $\alpha_2$ than the first segment 5 since it must mirror that component of the laser beam 3 which impinges thereon by the linear extent $q_1$ of the first segment 5 in the direction of the symmetry axis 2. The linear extent $q_2$ of the second segment 6 in the direction of the symmetry axis 2 must be different because of the different set angle $\alpha_2$. This linear extent $q_2$ be so selected that the work region 4 is again fully illuminated. The set angles ($\alpha_3$, $\alpha_4$) and the linear extents ($q_3$, $q_4$) of the respective segments (7, 8) are selected in a like manner.

This configuration of the mirror 1 proceeds on the premise that all rays from one point on the symmetry axis 2 impinge again on the symmetry axis 2 after being reflected by the mirror 1. This is applicable to the condition wherein the optical mirror 1 is rotationally symmetric with respect to axis 2 and otherwise exhibits any desired contour.

The laser beam 3 in FIG. 1 radiates into the mirror 1 parallel to the x-axis and illuminates the mirrored inner surfaces (5', 6', 7', 8') of the individual segments (5, 6, 7, 8) in the region 9. The mirrored inner surfaces (5', 6', 7', 8') then image the laser beam 3 in sections on the symmetry axis 2 of the conical mirror segments (5, 6, 7, 8) and in the desired work area 4 on the surface of the workpiece 10 to be irradiated. Mirrors 1 of the kind described above can be produced with modern numerically-controlled machine tools with high precision and at favorable cost so that this is especially advantageous when considered from the viewpoint of a manufacturer of such mirrors. The energy of the laser beam 3 imaged by the mirror 1 distributes into a narrower area 11a or a wider area 11b on the surface of the workpiece 10 to be irradiated in dependence on whether the surface of the workpiece 10 is in the same plane with the symmetrical axis 2 of the mirror or is disposed above or below this axis.

Figure 1A:
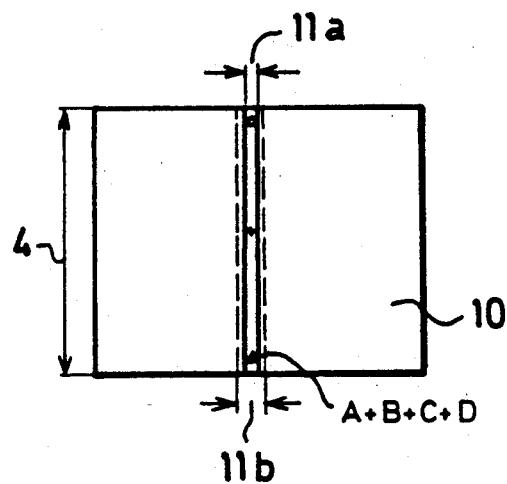
FIG. 1a shows the image of the light beam of FIG. 1.
Figure 1B:
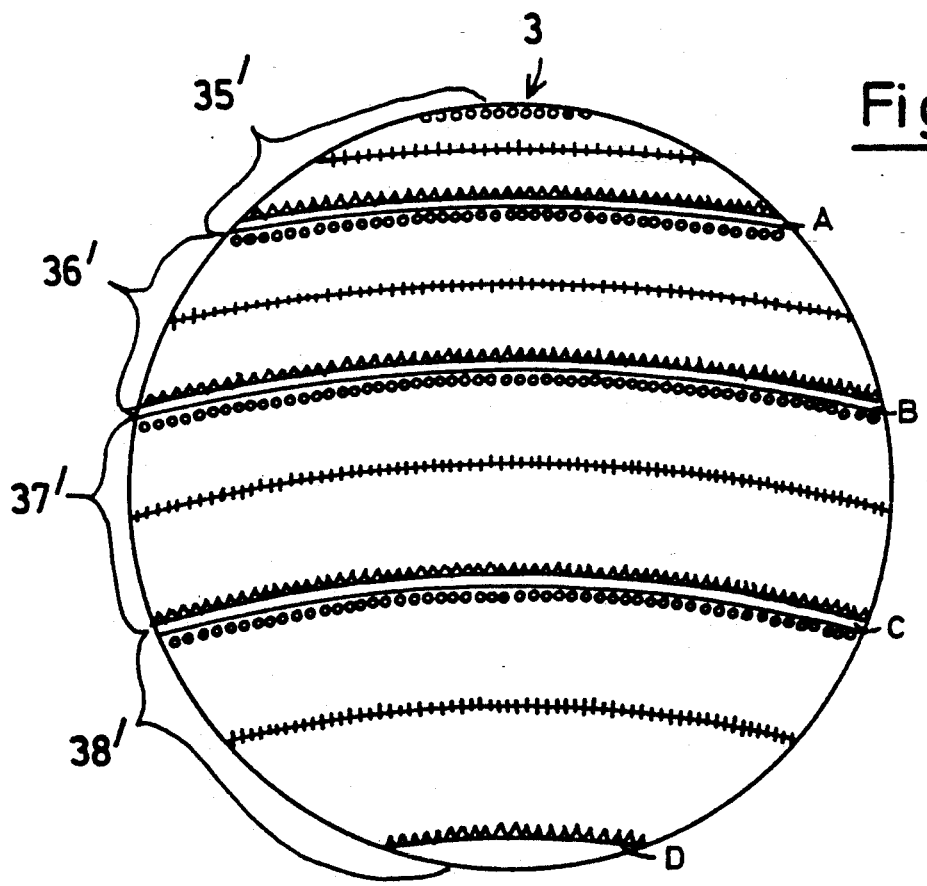
FIG. 1b shows the segmentation of the light beam of FIG. 1.

In FIG. 1a, three discrete points in the work area 4 are identified by a circle, a cross and a triangle, respectively. FIG. 1b shows which zones of the laser beam 3 are directed by the mirrored inner surfaces (5', 6', 7', 8')

of the segments (5, 6, 7, 8) of the mirror 1 into which point (circle, cross, triangle) in the work area 4 on the symmetry axis 2. The individual zones (35', 36', 37', 38') of the laser beam 3 are also shown and these zones are directed by the individual segments (5, 6, 7, 8) of the mirror 1 onto the symmetry axis 2. The zone 38' of the laser beam 3 is imaged by the mirrored inner surface 8' of the segment 8. The same applies to the other zones.

In FIGS. 2 to 5, different embodiments of the mirror of the invention with the different contours of mirrored inner surfaces of mirrors (21, 31, 400, 51) are shown in section. These mirrors image an axially parallel laser beam (27, 37, 47, 57) onto the surface of respective workpieces (29, 39, 49, 59) in a linear manner on the respective symmetry axes (20, 30, 40, 50) in the respective work areas (28, 38, 48, 58).

All mirrors (21, 31, 400, 51) are assembled of different sets of segments (22, 23, 24, 25, 26), (32, 33, 34, 35, 36), (41, 42, 43, 44, 45), (52, 53, 54, 55). These mirrors are in part manufactured from a single piece (31, 400) or from several components pieces (21, 51). The assembly of the mirrors (21, 51) from several discrete segments (22, 23, 24, 25, 26), (52, 53, 54, 55) is then always advantageous if the geometry of the mirrored inner surfaces of the segments (22, 23, 24, 25), (52, 53, 54, 55) on the interfaces of one segment (22, 23, 24, 25, 26), (52, 53, 54, 55) to the other segment (22, 23, 24, 25, 26), (52, 53, 54, 55) leads to a rounded edge (22', 23', 24', 25'), (52', 53', 54') and it is intended that the disturbances of the rays at the mentioned edges (22', 23', 24', 25'), (52', 53', 54') are held low. This problem is then especially given if the mirrored inner surfaces of the sets of segments (22, 23, 24, 25, 26), (52, 53, 54, 55) are only comprised of segments of planar cross section (22, 23, 24, 25, 26) or segments of convex cross section (52, 53, 54, 55).

In contrast, the segments (32, 33, 34, 35, 36), (41, 42, 43, 44, 45) of the mirrors (31, 400) can then be machined from one piece when the crossovers or edges (32', 33', 34', 35'), (41', 42', 43', 44') are planar (FIG. 3) or at an acute angle (FIG. 4). Since these two mirrors (31, 400) have precisely producible crossovers (32', 33', 34', 35') and edges (41', 42', 43', 44'), no losses of laser energy then occurs in these edges (32', 33', 34', 35'), (41', 42', 43', 44'). The reasons for the foregoing lie in manufacturing techniques because the lathe tools required for the production (such as individual diamonds) of a mirror of the invention always have rounded cutting edges. For this reason, pointed recesses such as shown in FIGS. 2 and 5 occurring at the joining locations between different segments can only be partially realized. In contrast, the protruding points shown in FIG. 4 can also be precisely manufactured with rounded tools.

For segments of the mirror having curved mirrored inner surfaces (FIGS. 3, 4 and 5) the advantage is afforded that the number (and therefore the length) of the segments on the one hand and the length of the focus line (e work area) on the other hand, can be selected independently of each other.

The segments in FIGS. 3 to 5 have essentially a circular cross section to make spheric or toric segments, a parabolic cross section or an elliptical cross section to make ellipsoid segments, respectively, in the direction of the symmetry axis and these cross sections correspond to the desired application and to the requirements imposed with respect to homogeneity of the intensity distribution.

A sample mirror 400 according to FIG. 4 with five concave paraboloid mirror segments (41, 42, 43, 44, 45) focuses a laser beam 47 of approximately 85 mm diameter onto a line 49 parallel to the laser beam 47 at a distance of approximately 340 mm to the center line of the laser beam 47. The line-like region 49 of a workpiece 40 whereon the laser beam 47 is focussed has a length 48 of 14 mm and a width of approximately 100 µm which is only limited by the laws of diffraction.

A cylindrical base plate (mirror) of approximately 120 mm diameter is large enough to receive and reflect all of the laser beam 47, and the five concave paraboloid mirror segments (41 to 45) thereof are made in one piece by diamond turning.

Figure 7:
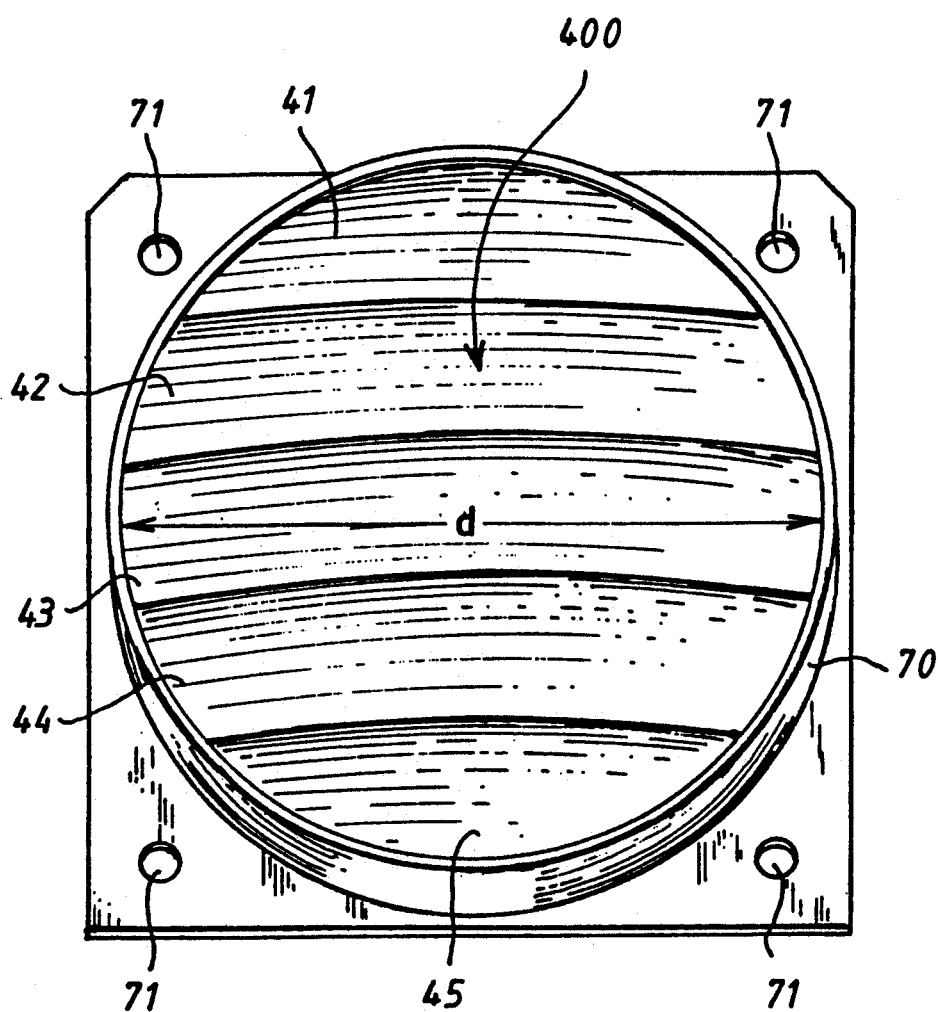

A perspective view of mirror 400 is provided in FIG. 7 wherein (d) identifies the diameter. The mirror 400 is formed on the base plate 70 by diamond turning with the base plate being advantageously made of high-purity copper. This material can directly define the reflecting surface especially for infrared light. Also, the copper can be coated with gold or silver with or without an additional reflection enhancing and/or protective dielectric layer. Reference numeral 71 identifies mounting holes.

The geometrical data of this mirror 400 are given in cylindrical coordinates with the origin at the center of the focus line 49, axial axis (z) and radial axis (y). The angular coordinate $\Phi$ (not shown) is limited by the base plate. This axis (z) is the rotational axis of a conventional cylindrical coordinate system. The angle $\Phi$ defines the angle of rotation in a plane perpendicular to the (z) axis and to the plane of the drawing and therefore cannot be shown in FIG. 4. Between each two edge lines (41", 41' to 45') of the concave paraboloid mirror segments (41 to 45), the profile line of each segment (41 to 45) is defined by the sum: $r = r_B + r_D$ of a basic parabola $r_B = a_0 + a_1 z + a_2 z^2 + a_3 z^3$ being the same for all segments (41 to 45) and a difference parabola $r_D = b_0 + b_1 z + b_2 z^2 + b_3 z^3$ being specific of each segment (41 to 45).

Table I delineates the coordinates of the edge lines (41", 41' to 45') and Table II delineates the parameters $a_0$ to $a_3$, $b_0$ to $b_3$ for the segments (41 to 45) of the sample mirror 400 described above.

TABLE I

| | z (in mm) | r (in mm) |
|---|---|---|
| 41" | 45.069 | 382.50 |
| 41' | 26.369 | 365.50 |
| 42' | 8.519 | 348.50 |
| 43' | −8.481 | 331.50 |
| 44' | −24.631 | 314.50 |
| 45' | −39.930 | 297.50 |

TABLE II

| $a_0 = 0.3400 \cdot 10^3$ | | $a_1 = 0.9999 \cdot 10^0$ | |
|---|---|---|---|
| $a_2 = 0.1434 \cdot 10^{-2}$ | | $a_3 = 0.4255 \cdot 10^{-5}$ | |
| | $b_0$ | $b_1$ | $b_2$ | $b_3$ |
| 41 | $0.1240 \cdot 10^1$ | $-0.7585 \cdot 10^1$ | $0.1263 \cdot 10^{-2}$ | $-0.4049 \cdot 10^{-5}$ |
| 42 | $0.2919 \cdot 10^0$ | $-0.3947 \cdot 10^{-1}$ | $0.1245 \cdot 10^{-2}$ | $-0.3992 \cdot 10^{-5}$ |
| 43 | $-0.4331 \cdot 10^{-1}$ | $0.6158 \cdot 10^{-4}$ | $0.1224 \cdot 10^{-2}$ | $-0.3910 \cdot 10^{-5}$ |
| 44 | $0.3223 \cdot 10^0$ | $-0.4299 \cdot 10^{-1}$ | $0.1203 \cdot 10^{-2}$ | $-0.3793 \cdot 10^{-5}$ |
| 45 | $0.1486 \cdot 10^1$ | $-0.8959 \cdot 10^{-1}$ | $0.1181 \cdot 10^{-2}$ | $-0.3615 \cdot 10^{-5}$ |

The incident angles of the laser beam (27, 37, 47, 57) as well as the geometric characteristics of the beam vary in a wide range for a corresponding computation of the mirror.

Figure 6:
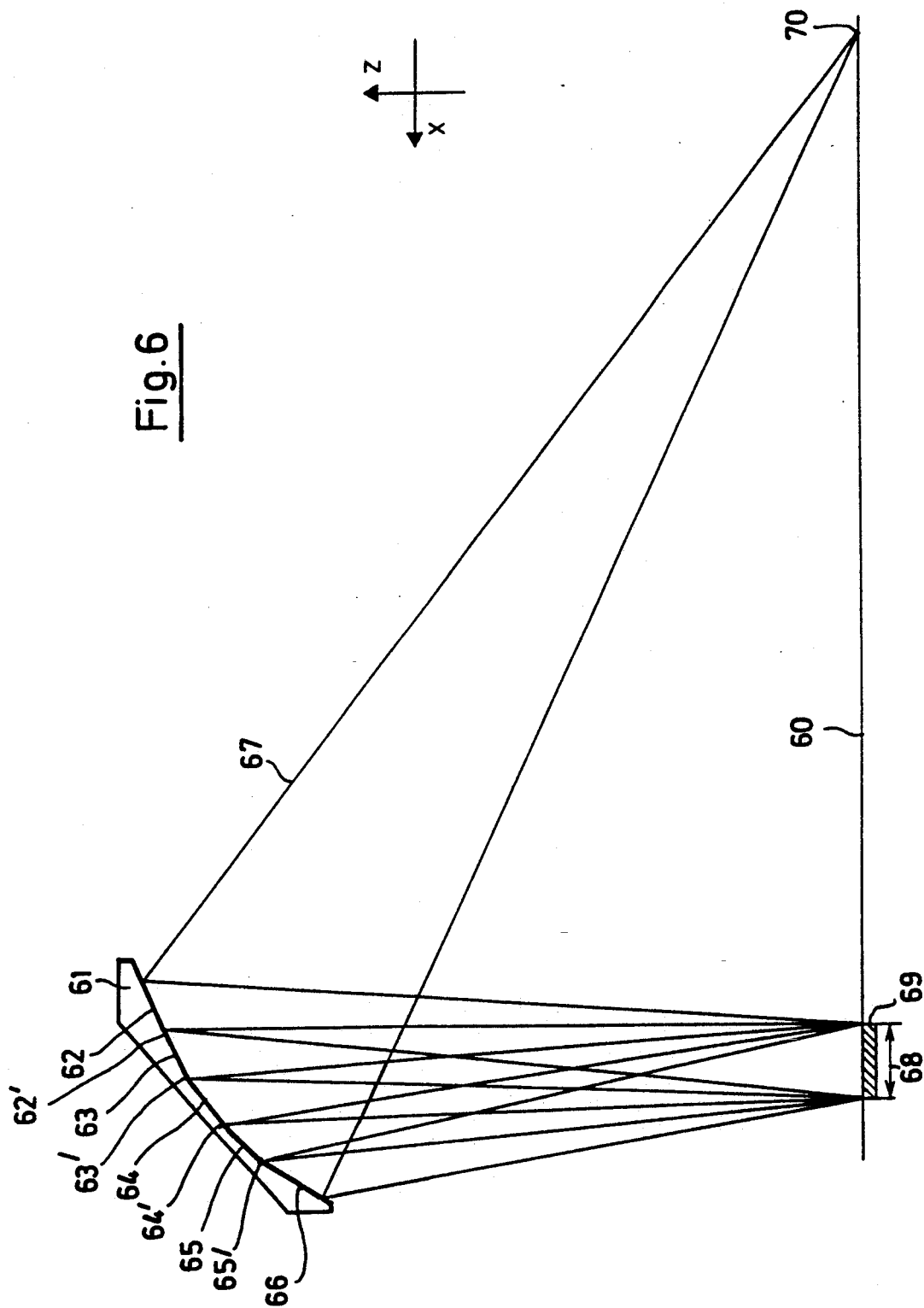
FIG. 6 is a section view of still another embodiment of the mirror of the invention having conical segments and wherein the incident beam is shown as a beam having divergent rays; and, FIG. 7 is a perspective view of the mirror shown schematically in FIG. 4.

FIG. 6 shows the application of a mirror 61 for irradiating the surface of a workpiece 69 in a linear work area 68 on the symmetry axis 60 of the mirror 61. The beam 67 is neither parallel to nor coincident with the symmetry axis 60; instead, the beam 67 is divergent and has a source point 70 on the symmetry axis 60 (that is the rotational axis) and is imaged by the five segments (62 to 66) of the mirror on the linear work area 68. A jump in the image occurs at each connecting line of the segments (62' to 65') from the end of the work area 68 to its beginning. The work area 68 is a section on the symmetry axis 60. Inclination and length of the segments (62 to 66) are so selected that the focal lines corresponding thereto on the symmetry axis 60 are equal in length and have the same position. The suitable dimensions can easily be computed with known numerical computation processes.

It is understood that the foregoing description is that of the preferred embodiments of the invention and that various changes and modifications may be made thereto without departing from the spirit and scope of the invention as defined in the appended claims.

What is claimed is:

1. A mirror for imparting a linear cross section to a light beam and reflecting the beam onto a line-like region of a workpiece, the mirror comprising:
    a single mirror body having a plurality of rotational aspherical surface reflective segments formed thereon integral with said body;
    said reflective segments being disposed one next to the other so as to define a continuous uninterrupted reflective surface;
    said reflective segments having respective rotational axes superposed one upon the other on a line-like region of said workpiece;
    said reflective segments having respective sizes selected so as to cause the light beam to impinge simultaneously upon several of said segments so as to reflect respective zones of said beam; and,
    said reflective segments each being formed and aligned so as to cause the light of each one of said zones to be reflected only once by the surface segment corresponding thereto and be directed onto said line-like region of the workpiece with said zones of light being superposed on each other on said line-like region to provide an intensity distribution of said beam which is homogeneous in said line-like region.

2. The mirror of claim 1, wherein said reflective segments are joined to conjointly define a compact component.

3. The mirror of claim 1, wherein said reflective segments are contiguous to each other.

4. The mirror of claim 1, wherein said reflective segments are formed from one part.

5. The mirror of claim 1, wherein each two mutually adjacent ones of said segments conjointly define a contact line therebetween and said two segments conjointly define an angle at said contact line which is equal to or greater than 180°.

6. The mirror of claim 1, wherein said segments conjointly define a concave-convex contour when viewed in cross section.

7. The mirror of claim 1, wherein said line-like region is linear.

8. The mirror of claim 1, wherein said region has a substantially rectangular configuration.

9. A method of processing the surface of a workpiece with a laser beam and a single mirror body having a plurality of rotational aspherical surface reflective segments formed thereon integral with said body; said rotational aspherical surface reflective segments being disposed one next to the other and defining respective rotational axes superposed one upon the other on a line-like work area of the workpiece, said reflective segments defining respective continuous uninterrupted reflective surfaces, the method comprising:
    directing a laser beam toward said mirror so as to impinge simultaneously upon several of said reflective segments so as to reflect respective zones of said beam; and,
    forming and aligning all of said reflective segments so as to cause said zones of light to be reflected directly from said reflective segments onto said line-like work area on the surface of the workpiece so as to permit said zones of light to be superposed on each other on said line-like work area to an intensity distribution of said beam which is homogeneous in said work area.

* * * * *

UNITED STATES PATENT AND TRADEMARK OFFICE
CERTIFICATE OF CORRECTION

PATENT NO. : 5,285,320

DATED : February 8, 1994

INVENTOR(S) : Gerhard Hohberg

It is certified that error appears in the above-identified patent and that said Letters Patent is hereby corrected as shown below:

In column 4, line 1: after "incident", insert -- light --.

In column 4, line 34: after "$q_2$", add -- must --.

In column 5, line 57: delete "(e" and substitute -- ($\hat{=}$ -- therefor.

Signed and Sealed this

Twenty-sixth Day of July, 1994

*Attest:*

BRUCE LEHMAN

*Attesting Officer      Commissioner of Patents and Trademarks*